Dec. 8, 1925.  1,564,615

C. G. OLSEN

EGG TREATING DEVICE

Filed Jan. 2, 1924  5 Sheets-Sheet 1

Inventor:
Carl G. Olsen
By Luther Johns
Atty.

Dec. 8, 1925.

C. G. OLSEN 1,564,615

EGG TREATING DEVICE

Filed Jan. 2, 1924

5 Sheets-Sheet 2

Inventor:
Carl G. Olsen
By Luther Johns
Atty

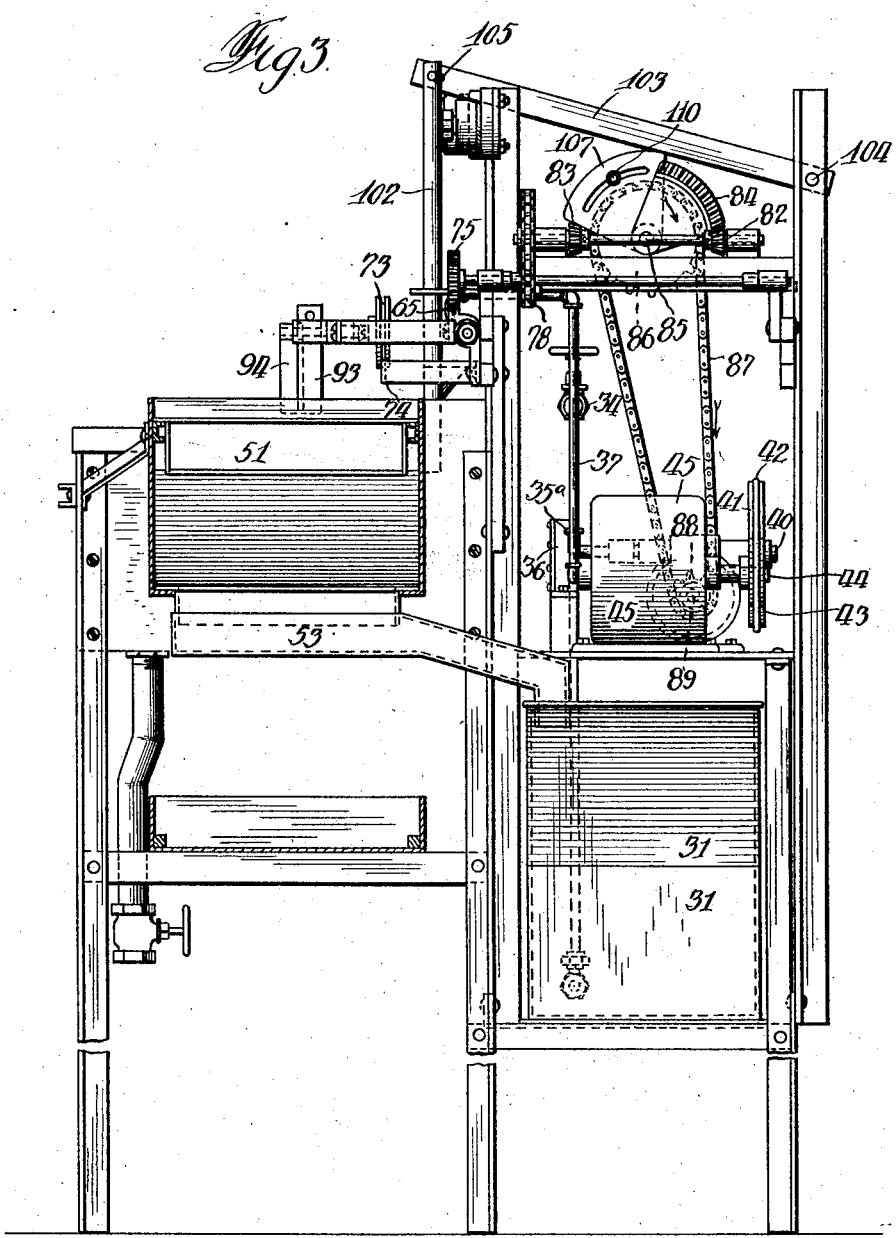

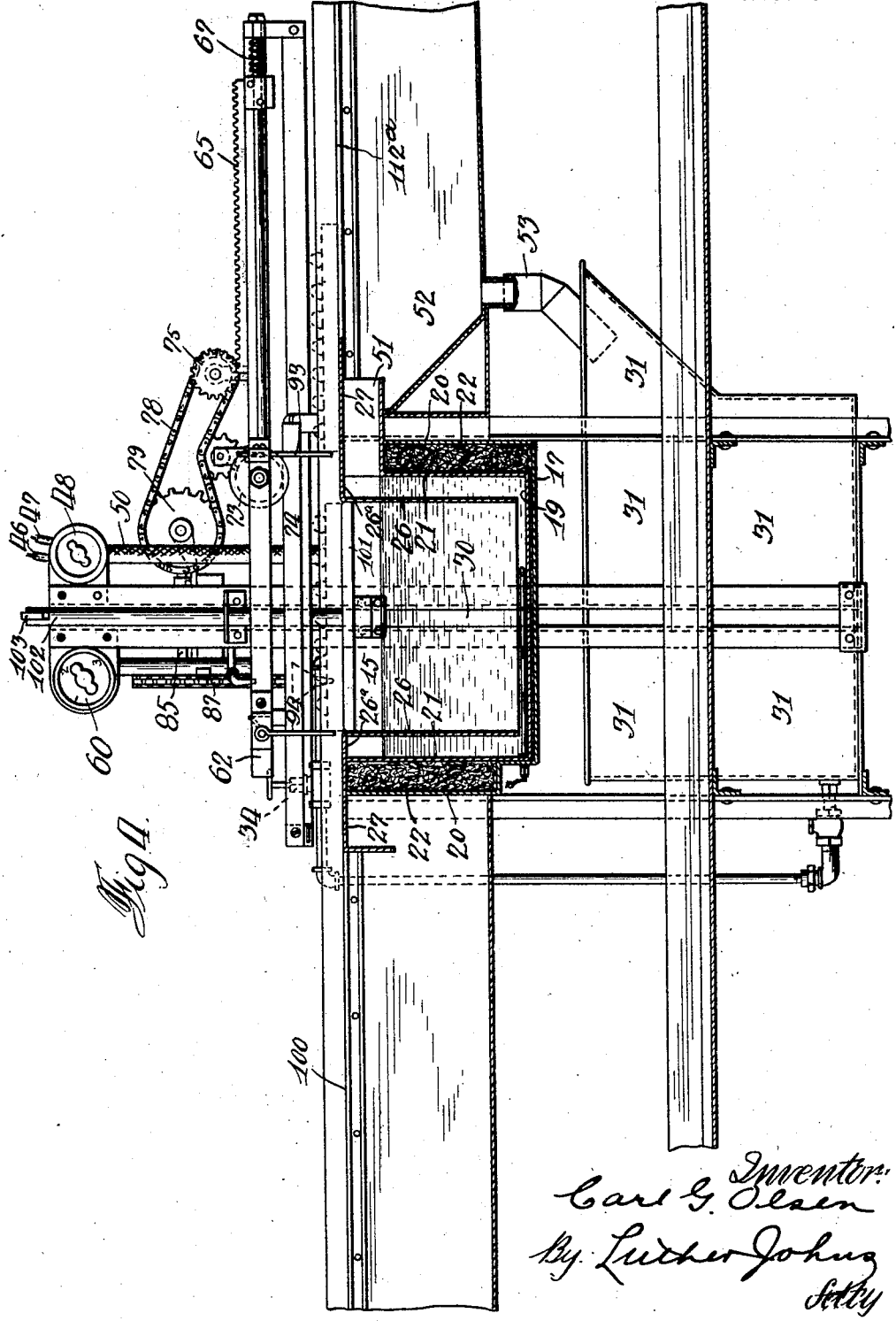

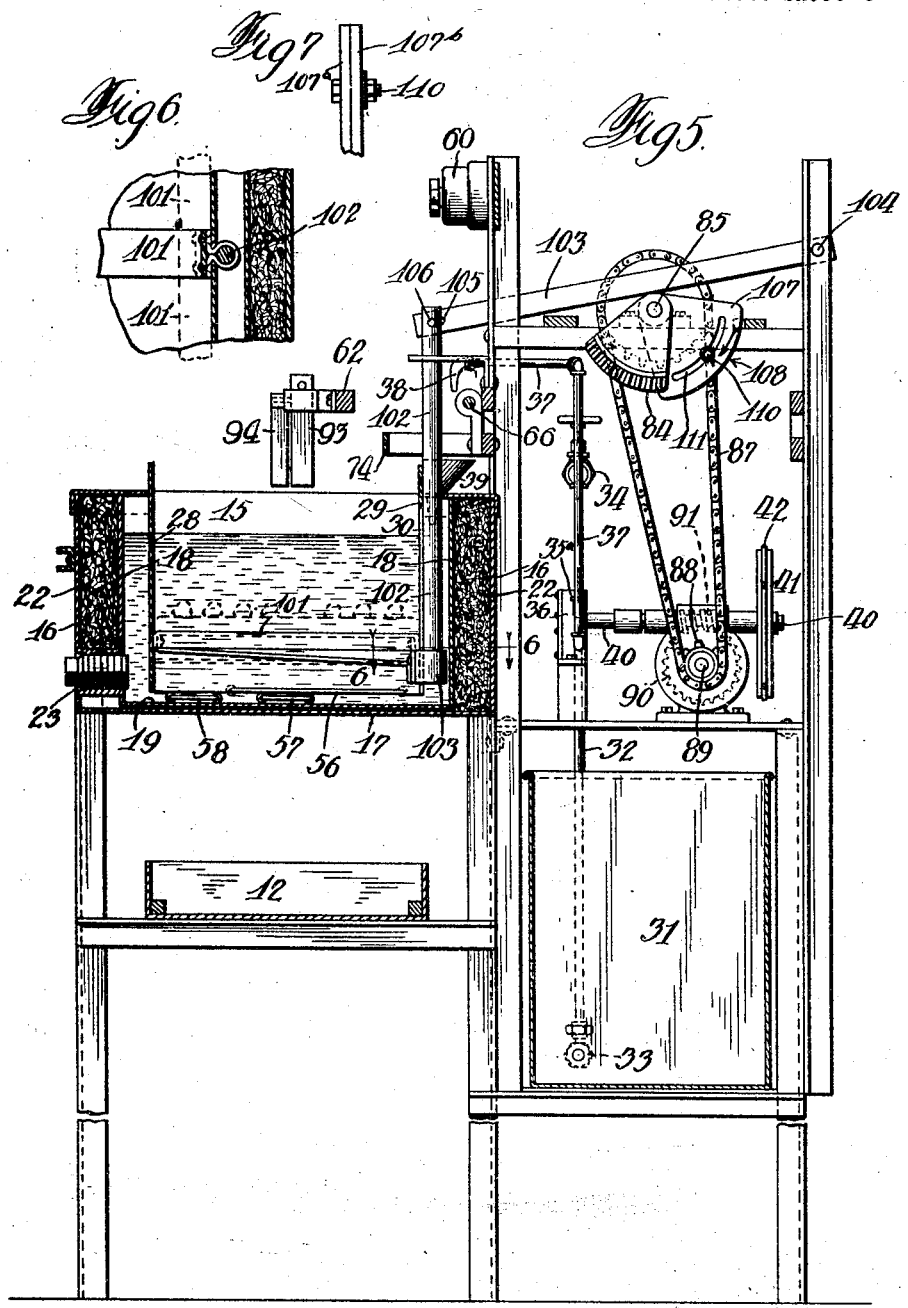

Patented Dec. 8, 1925.

1,564,615

UNITED STATES PATENT OFFICE.

CARL G. OLSEN, OF CHICAGO, ILLINOIS, ASSIGNOR TO VICTOR CLAIREMONT, OF CHICAGO, ILLINOIS.

EGG-TREATING DEVICE.

Application filed January 2, 1924. Serial No. 683,904.

*To all whom it may concern:*

Be it known that I, CARL G. OLSEN, a citizen of the United States, and a resident of Chicago, Cook County, Illinois, have invented certain new and useful Improvements in Egg-Treating Devices, of which the following is a specification.

The present improvements relate to devices for treating eggs by means of a liquid bath. Its object is to provide an egg treating machine and features thereof according to which such advantages are had as increased output, simplification of operation, better control of temperatures involved, and of the treating solution, greater security against mischance due to carelessness of the operator, and in general, greater efficiency than in devices hitherto suggested for the purpose. It is an object also to provide improvements in structure, and in arrangement of parts. Other objects and advantages will appear hereinafter.

Figure 1:
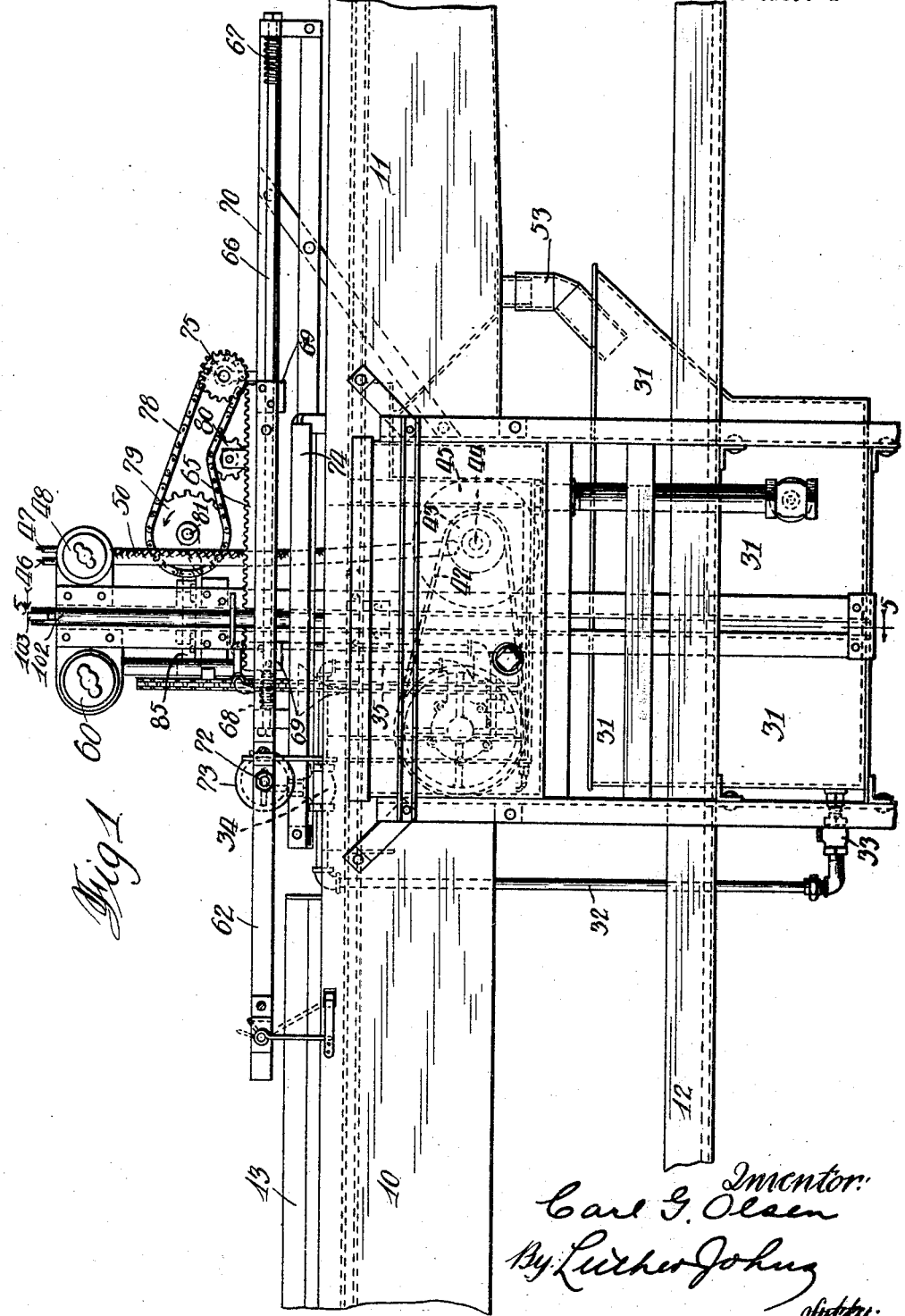
Figure 2:
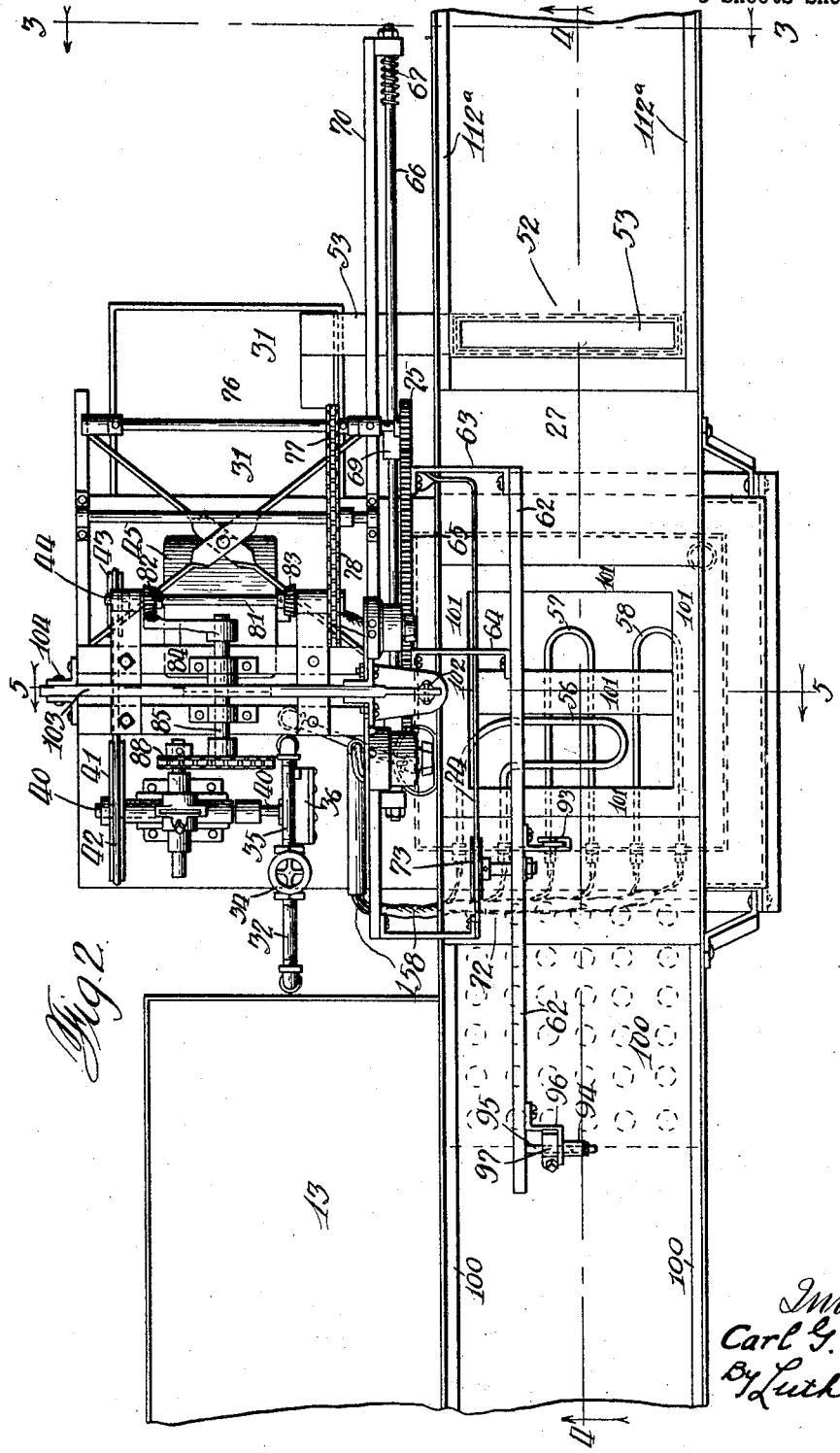

In the accompanying drawings, which form a part of this specification, Figure 1 is a side elevation of a machine embodying the present improvements, certain platform extensions or feed and delivery tables being partly broken away; Fig. 2 is a top plan of the device of Fig. 1; Fig. 3 is an end elevation of the machine as on the line 3—3 of Fig. 2; Fig. 4 is a longitudinal vertical section as on the line 4—4 of Fig. 2; Fig. 5 is a transverse vertical section as on the line 5—5 of Figs. 1 and 2; Fig. 6 is a fragmentary detail on the section line 6—6 of Fig. 5; and Fig. 7 is a detail of the adjustable cam or lifting lever shown, for instance, in Fig. 3.

The various mechanisms are shown as being mounted on a frame of structural iron adapted to rest upon the floor. The top surfaces of the feed table or extension 10 (Fig. 1) and of the delivery table or extension 11 are at about ordinary table height. The trough-like receptacles 12 and 13 are adapted to receive trays containing eggs either before or after treatment. The platform 13, Figs. 1 and 2 is designed for the accommodation of trays or eggs at a convenient location for feeding them through the machine.

*Treating fluid system.*—From Figs. 4 and 5 will be seen that there is an open-top chamber or receptacle 15 which is adapted to contain a quantity of the treating liquid. In its construction there are outer side walls 16 and a bottom wall 17 formed of sheet metal, within which are inner side walls 18 and a bottom wall 19, and it includes also (Fig. 4) outer end walls 20 and inner end walls 21. Figs. 4 and 5 also show that between the outer and inner side walls and the outer and inner end walls there is a heat-insulating material 22, which may be considered asbestos, a plug 23, Fig. 5, occupies space which may contain a thermostat for thermostatic control of the device according to well understood practice in other arts.

Figs. 4 and 5 also show an open-top and open-bottom rectangular structure of sheet metal spaced from the inner walls of the liquid container 15 and comprising end walls 26 which extend upward to the working surface and then turn laterally and form extensions 27 which are rigidly secured to frame parts, and this inner structure also has a side wall 28 and a side wall 29, the latter having a vertical slot-like opening well seen in Fig. 4. This inner rectangular structure constitutes guiding or retaining means for the tray of eggs at any time being treated by the liquid and provides that the crate will have a definite position when raised out of the bath.

There is a supply tank 31 in the lower portion of the device adapted to contain a materially large quantity of the treating liquid. A pipe 32 having a check valve 33, Fig. 1, leads from this tank 31 to a hand-operable valve 34, and thence a pipe 35 extends to a centrifugal pump 36 (Fig. 2, and see dotted lines of Fig. 1). In Figs. 3 and 5 the pipe 35 leading from the globe valve 34 is directly behind the pipe 37, but the connection of the pipe 35 with the pump 36 is shown at 35ª. The discharge from the pump 36 is through the pipe 37 which terminates in a downwardly-bent end or nozzle 38 directed towards a funnel 39 which discharges into the treating chamber 15.

The rotary pump 36 is operated by a shaft 40 driven by a pulley 41 on which is a belt 42 (Fig. 2) which runs upon the pulley 43 (Fig. 2) on the shaft 44 of the motor 45 (see also dotted lines Fig. 1). Current for operating the motor is led to the device by cables 46 and 47, (Fig. 1) and a switch 48 controls the current passing to the motor through the cable 50.

Turning to Fig. 4 it will be noted that a constant level of liquid in the treating receptacle 15 is normaly maintained by an overflow trough 51 discharging into a catch basin 52 having a discharge conduit 53 leading downward and laterally into the main reservoir 31, Figs. 2 and 4.

According to the description thus far given it is clear that so long as the pump is maintained in operation the treating liquid will be kept in circulation through the treating chamber 15, and that a constant level of the liquid therein will be had, and all without attention thereto on the part of the operator. Among the advantages of such automatic and continuous circulation are the thorough admixture and comingling of the various ingredients of the treating liquid or solution, the constant supply of an adequate amount of liquid, and the control of the temperature of the treating liquid.

The liquid is heated by heating elements shown as three in number, namely 56, 57 and 58 (Fig. 2) which may be considered as copper pipes loop-shaped and positioned in the bottom of the receptacle 15, each of which is to be understood as containing electric resistance wire suitably insulated from the copper pipe. Such heating units may be according to well understood practice in other arts. As here applied there is provision for a separate electric circuit through each of the heating units as by the wire cables indicated at 158, Fig. 2 and which lead to the switch 60, Figs. 1 and 4. The switch 60 is so constructed, according to well known switch practice, that the current may be caused to pass only through heating unit 56, or through the heating units 56 and 57 or through the units 56, 57 and 58 with the result that a low, a medium, and a high degree of heat may be supplied to the liquid in the receptacle 15 as desired. On starting operations, with the liquid cold, ordinarily all three heating units would be put into service and maintained in service until the body of liquid as a whole becomes sufficiently heated to warrant the cutting out of one or more of the heating units.

In some methods of treating eggs, and as contemplated by the present apparatus, the heating liquid should be maintained at a considerable temperature, for instance, somewhat above that of boiling water, but this temperature may vary according to the particular method or solution involved. According to these improvements in this respect substantially any desired temperature can be maintained, in a simple and easy way. A thermometer (not shown) fixedly immersed in the chamber 15 would indicate to the operator any variation in the temperature of the liquid, and by merely turning the switch one way or the other the proper adjustment of the temperature can be made.

*Egg handling mechanism.*—According to the operation of the device, the eggs to be treated are first placed in shallow rectangular trays or crates according to practice hitherto, and similarly according to hitherto practice the crate of eggs is moved over the top opening of a treating receptacle, is then lowered therein for a predetermined period, is then raised out of the treating liquid, and is moved away from that part of the device. According to the present improvements that series of operations is performed more advantageously and satisfactorily and with less likelihood of mischance in operation than according to practices hitherto and according to mechanisms more satisfactory in operation.

For carrying the tray of eggs forward to the treating receptacle, and then away from the treating receptacle, the mechanism shown includes a longitudinally-extending bar 62 (Fig. 2) which is secured by brackets 63 and 64 to a toothed rack 65, and this frame-like structure is mounted for sliding movement on a rod 66 having at one end a cushioning spring 67 (Fig. 1) and at the other end thereof a cushioning spring 68, there being a pair of apertured connections 69 fastened to the rack and through which the rod 66 extends. The rod 66 is mounted on a support 70, Figs. 1 and 2, rigid with the frame of the machine. The crate-pushing rod 62 has mounted thereon a shaft 72 carrying a grooved wheel 73 resting on a track 74 secured rigidly to the frame of the machine. This track 74, consisting of a strip of metal set edgewise, and the rod 66 are parallel with each other and support the frame-like structure including the push rod 62 and the rack 65 for reciprocating movement.

Motion is imparted to the rack 65 by a pinion 75 on a shaft 76 on which is mounted also a sprocket 77 (Fig. 2) on which travels the chain 78 passing over the sprocket 79. The sprocket 80 is merely an idler intended to take up slack in the chain. The driving sprocket 79 is mounted on a shaft 81 having two beveled pinions 82 and 83, sufficiently spaced apart so that the arcuate rack 84 in its continuous movement in one direction will alternately engage one and then the other of these beveled pinions 82 and 83. The arcuate rack 84 is mounted on a shaft 85 on which is also mounted a sprocket 86 on which travels the chain 87 deriving motion from a sprocket 88 on a shaft 89 on which is mounted a gear 90 (shown by dotted lines in Fig. 5) meshing with a worm 91 on the shaft 40. This shaft 40, as noted, is the one which operates the centrifugal pump 36.

The toothed part of the arcuate rack 84 is of such length that while it is in engagement with the beveled pinion 82 (Fig. 3) the push rod 62 will be carried forward the required distance to move one tray of eggs away from the treating chamber and another tray into position to be lowered into the treating chamber. On the continued movement of the arcuate rack 84 it comes into engagement with the pinion 83, the result of which is to move the shaft 81 in the reverse direction on which these pinions 82 and 83 are mounted, and consequently to move the push rod 62 in the reverse direction, and continuously during the operation of the machine the push rod 62 is moved back and forth.

There are two crate-engaging stops carried by the push rod 62. One of these is a relatively fixed stop or pusher 93 which is so positioned as to push a tray of eggs away from the treating receptacle 15 on a forward movement. The other push element 94 is mounted rigidly on a shaft 95, Fig. 2, which is mounted to rock in the bar 62 and in the bracket 96. A stop member 97 on the shaft 95 is adapted to engage the bracket 96 and hold the depending bar or pusher 94 against movement beyond a substantially vertical position on the forward movement so that pushing force may be exerted thereby, the construction being such, however, that this swinging pusher 94 may yield as it trails over a crate of eggs and then fall down into pushing position after coming beyond the tray on the reverse movement of the rod 62.

The operator places one tray of eggs after another upon the platform 100, Fig. 2, with the forward edge of the crate close to the top of the treating chamber 15 and the movement of the push rod 62 is such that the tray is then carried forward directly over the top opening of the receptacle 15. At that time there is present there to receive it a vertically reciprocating frame 101, Fig. 2, which is rigidly carried by a vertical rod 102, Fig. 5, moving up and down outside the wall 29, the connection 103 between the rod and the frame moving in the slot 30 in this wall 29.

A lift rod 103 (Figs. 3 and 5) is pivotally connected at 104 to the frame of the machine, and at its forward end is a slot 105 in which plays a pin 106 connecting the ends of the vertical rod 102 and the lift rod 103 together. A cam 107 on the shaft 85 has a circular dwell surface at 108, and the effect of the cam contacting the lift rod 103 is to raise the forward end of that rod and with it the vertical rod 102 and the platform 101, and to cause the various parts last mentioned to dwell or rest in a raised position while the arcuate surface 108 is travelling upon the under surface of the lift rod 103. The platform 101 is thus held in a raised position and on a plane with the top surface of the feed platform 100 and that of the delivery platform 112, as may be noted from Fig. 4, and while in that raised position the push rod 62 is being moved forward, or from left to right as viewed in Fig. 4, and a tray of eggs is moved from the platform 100 upon the vertically movable platform 101. Simultaneously with the last mentioned movement of a crate the preceding crate raised out of the treating liquid has been moved by the pusher 93 off of and away from the platform 101 and upon the delivery platform 112. When the dwell portion 108 of the cam 107 comes out of contact with the lift rod 103 that rod descends by gravitation and the crate of eggs then positioned on the platform 101 is lowered into the treating liquid where it remains until the lift portion of the cam 107 again contacts the lift rod 103.

The time during which the tray of eggs remains immersed in the treating liquid could be made to depend upon the speed at which the machine is operated by the motor, but such method of control would not be satisfactory in various respects. Given a normal rate of operation of the machine by a given size of motor I vary the time of immersion by varying the effective length of the lift portion of the cam. To this end I form the cam 107 in two facing parts 107$^a$ and 107$^b$ bolted together by the bolt 110 movable in the slot 111 in one of the two cam parts. These parts 107$^a$ and 107$^b$ may thus be moved adjustably relative to each other.

Since the cam 107 and the arcuate rack 84 are both on the shaft 85 it results that a complete revolution of the shaft 85 moves the push rod 62 once back and forth and the platform 101 once up and down, and the arrangement is such that so long as trays of eggs are fed into the receiving position on the platform 100 they are successively moved upon the tray 101, then lowered into the bath, then raised, and then moved off and away from the platform 101 on to the receiving platform 27. From Fig. 2 it will be noted that this receiving platform 27 is open to a considerable extent and that the trays will move along marginal supports 112$^a$ over part of their course of travel after being treated. Drippings of the treating liquid therefore fall into the overflow receptacle 52 and thence return to the main supply receptacle 31.

The device is constructed with a safety provision in that the rack 65, Fig. 4, and its relation to the driving pinion 75 are such that when the rack has been moved forward its full distance as shown in Fig. 4, the front end thereof puts the cushioning spring 67 under tension and if the rack 75 be rotated further in the rack-advancing direction the teeth of the pinion 75 will simply rub against the last tooth of the rack 65. The spring 67 maintains the last tooth in engagement with the pinion 75 so that on the reverse movement of that pinion the rack will be caught and moved in the reverse direction, and the arrangement is such that the same action takes place at the other end of movement, when the rack is fully moved back into initial position, the pinion 75 then simply playing upon the last tooth at the other end of the rack 65 as shown in Fig. 1. If it should happen that the rack 75 were moved by hand by an operator for any purpose during the operation of the machine so that the proper timed relation of the movement of the rack to the up-and-down movement of the table 101 is destroyed, this proper relation is automatically restored upon the completion of the ensuing stroke of the rack, for the rack is not moved on a return stroke in either direction except out of its position at the end of a stroke. In other words should the rack 65 reach the end of its stroke before the proper time, because of some interference, it will be held there by the pinion 75 rubbing against the end tooth of the rack until the time when it should have reached that end of the stroke, and thereupon all of the parts are again set for the properly timed movements.

When a tray of eggs is on the vertically reciprocating platform 101 (Fig. 4) the tray is maintained in its proper position, while moving down and then up in the treating receptacle, by the walls 26 (Fig. 4) and 28 and 29 (Fig. 5). These walls 28 and 29 extend above the open-top receptacle and serve as guides for the tray when moving on and off of the platform 101. The tubular heaters 56, 57 and 58 positioned adjacent to the bottom of the treating receptacle have a materially large part of their heating surfaces respectively directly below the inner chamber defined by the walls 26, 28 and 29, and the liquid in this middle restricted area in the treating chamber is directly heated by the heating units. The movement of the platform 101 with a tray of eggs thereon causes the liquid in the inner chamber to be displaced to a considerable extent, after the manner of suction pump apparatus, with the result that the fresh liquid supplied to the treating chamber between the walls 29 and 18 (Fig. 5) at the funnel 39 is caused to pass downward and then closely in association with the heating units before it enters the inner chamber. The arrangement is such as to insure the desired temperature of the treating liquid at the place where the eggs are immersed therein, which temperature, according to good practice, may be fairly high, for instance 234 degrees F. to say 250 degrees F. The double wall construction of the treating chamber, with heat insulating material as 22 between the inner and outer walls thereof, has the effect of saving many heat units which would otherwise be dissipated, and in this connection it is pointed out that only that portion of the treating chamber is open at the top which accommodates the platform 101, and that portion of the treating chamber between such walls as 26 and 21 (Fig. 4) is covered as by the top walls 26ª, and heat units are thereby also conserved. When a tray of eggs is on the platform 101 the open-top of the treating receptacle is pretty well closed or obstructed, and according to the present construction the liquid in the treating receptacle is preserved against heat radiation to quite an unusual degree, thus increasing efficiency and saving expense.

It is old practice to treat eggs in trays by dipping them by mechanical means into a treating receptacle, to guide the tray holder in its vertical movements, to heat the liquid by gas burners positioned beneath such receptacles, to move the trays mechanically on horizontal lines, and to employ a lift arm and a cam for raising the tray holder. Reference may be had to the patents of Victor Clairemont in this connection.

What I consider to be novel herein is set forth in the claims appended hereto, and I contemplate as being included in these improvements all such changes, modifications and departures from what is herein specifically illustrated and described as fall within the scope of these claims.

I claim:

1. In an egg-treating machine of the character described, the combination of walls forming an open-top treating chamber, a holder for a tray of eggs mounted to move up and down in said chamber, and means for continuously moving up and down said holder in said chamber including a member adjustable to vary the period during which the tray of eggs will remain immersed in the treating liquid.

2. In an egg-treating machine of the character described, the combination of walls forming an open-top treating receptacle adapted to contain treating liquid, a holder for a tray of eggs mounted to move up and down in said receptacle, means for continuously moving said holder up and down including a lift rod pivotally mounted to a relatively fixed part, a connection between said lift rod and said holder, and a rotatably-mounted cam operatively positioned so as to contact said lift rod to lift the holder, said cam having a dwell surface thereon adjustable as to the length thereof to vary the period during which the holder will remain in the liquid in the receptacle.

3. In an egg-treating device of the character described, the combination of walls forming an open-top treating chamber adapted to contain treating liquid, means for moving a tray of eggs into and out of the treating chamber, liquid discharge means adapted to maintain a predetermined quantity of liquid in the treating chamber, a supply receptacle, means for carrying to the supply receptacle overflow liquid from the treating chamber, and pump means for discharging into the treating receptacle liquid from the supply receptacle.

4. In an egg-treating device of the character described, the combination of walls forming an open-top treating chamber, means for heating treating liquid in said chamber, means for automatically moving a tray of eggs to the treating chamber and then into the liquid in the treating chamber and then out of said liquid and then away from said treating chamber, means for automatically supplying treating liquid to the treating chamber during the operation of the machine, and means for maintaining the liquid in the treating chamber at a predetermined relative elevation.

5. In an egg-treating machine of the character described, the combination of a substantially horizontal receiving platform and a substantially horizontal delivery platform on substantially the plane of the receiving platform, walls forming an open-top treating chamber between said platforms, the top of the heating chamber being substantially on a plane with said receiving and said delivery platforms, a tray-holder mounted to move vertically up and down in said treating chamber and to have its upper surface substantially on the plane of the receiving and delivery platforms when in its raised position, a horizontally movable member mounted to reciprocate back and forth above the receiving and delivery platforms and above said vertically-movable tray-holder, tray-engaging means on said horizontally reciprocating member for moving away from said vertically movable tray-holder and on to the delivery platform a tray of eggs resting on said tray-holder and for simultaneously moving upon the tray-holder a tray of eggs resting on the receiving platform, means for moving said vertically-movable tray holder up and down in timed relation to the movement of said horizontally-reciprocating member whereby when the tray-holder is in its raised position one tray of eggs is moved off of the tray-holder and on to the delivery table and another tray of eggs is simultaneously moved from the receiving table on to the tray-holder.

6. In an egg-treating device of the character described, the combination of walls forming an open-top treating chamber, means for raising and lowering a tray of eggs thereinto, a reciprocating member for moving a tray of eggs into position to be lowered into said treating receptacle and also for simultaneously moving a tray of eggs away from said treating receptacle after having been treated therein, and means for moving back and forth said reciprocating member including a shaft having a pair of spaced-apart pinions and a second shaft having an arcuate rack of limited extent adapted to engage first one of said pinions and then the other thereof, to drive alternately in opposite directions the shaft having said two pinions, a rack in driving relation to said reciprocating member, a pinion meshing with said rack, and means for communicating rotative motion to said pinion from the shaft having said two pinions.

7. In an egg-treating device of the character described having a reciprocating member for moving a tray of eggs into and out of a given position, the combination therewith of a straight rack in driving relation to said reciprocating member, a pinion meshing with said rack, cushioning means at each end of the stroke of said reciprocating member, the length of said rack being such that when said pinion has driven the rack to the end of its normal stroke said pinion is in engagement only with the last tooth of the rack, said cushioning means being so arranged that the last tooth of the rack is maintained in contact with said pinion, the arrangement being such that any further rotation of the pinion beyond that required to move the rack its normal distance in either direction causes a slippage of the pinion upon the last tooth of the rack, and means for driving said pinion alternately in one direction and then the other.

8. In an egg treating machine, the combination with a vertically-reciprocating tray holder, of an open-top treating receptacle adapted to contain treating liquid and to accommodate said tray holder, said receptacle having inner and outer walls spaced apart, with heat insulating material between said inner and outer walls, and means for heating liquid in said receptacle.

9. In an egg treating machine, the combination of walls forming an open-top treating receptacle adapted to contain treating liquid, a vertically movable platform mounted to reciprocate therein, and walls forming an inner chamber open at the top and spaced from said treating chamber, said inner chamber walls being open also at the lower portion thereof, and a heating unit in the lower portion of said receptacle.

10. In an egg treating machine, walls forming an open-top treating receptacle, said receptacle structure comprising inner and outer walls spaced apart, with heat insulating material between said spaced-apart walls, a vertically movable tray holder mounted to reciprocate up and down in said treating chamber, guide means for holding a tray of eggs in its proper position when on said platform, means adjacent to the bottom of the treating receptacle for heating treating liquid therein, and over-flow means providing for a given maximum relative elevation of the liquid in said receptacle.

11. In an egg treating device, walls forming a treating receptacle adapted to contain treating liquid, walls within said receptacle forming an interior chamber spaced from the walls of said receptacle, said interior chamber being open at the top and being open to receive treating liquid from areas in the treating receptacle outside of said interior chamber, means in the treating receptacle for heating the treating liquid, means covering that part of the treating receptacle at the top thereof between the treating receptacle walls and the walls forming said inner chamber, and means for raising and lowering a tray of eggs into and out of said inner chamber.

CARL G. OLSEN.